United States Patent Office 3,112,990
Patented Dec. 3, 1963

3,112,990
PROCESS FOR SEPARATING CERIUM FROM TRIVALENT RARE EARTHS
Pawel Krumholz, Rua Maestro Elias Lobo 241, Sao Paulo, Brazil
No Drawing. Filed Aug. 19, 1958, Ser. No. 755,893
Claims priority, application Brazil Sept. 2, 1957
1 Claim. (Cl. 23—14.5)

One of the oldest methods used for the separation of cerium from other rare earths consists in the treatment of an aqueous suspension of the oxides or hydroxides of those elements with an excess of chlorine or bromine. The halogens transform the trivalent cerium contained in the mixture into the oxide or basic chloride (or bromide) of quadrivalent cerium which is insoluble in the slightly acid medium. The other rare earths contained in the mixture are transformed by the excess of the halogens into soluble halides by a reaction the mechanism of which is not quite well understood and which probably consists in a catalytic decomposition of the hypohalides formed as the first product of the reaction.

The present invention refers to an improved process of separating cerium from other rare earths present as hydroxides, carbonates or basic salts. According to the present invention, an aqueous suspension of such material is treated with chlorine in a quantity only slightly higher than that necessary for the oxidation of the cerium contained in the mixture. Thereafter, hydrochloric acid is added until most of the trivalent rare earths are dissolved, whereas most of the cerium remains insoluble in the form of a basic chloride of quadrivalent cerium.

This improved process thus essentially differs from those used before. Contrary to the older method using chlorine as oxidising as well as dissolving agent, in the new and improved process the function of the chlorine is essentially that of an oxidising agent, whereas hydrochloric acid is used as a solvent for the trivalent rare earths.

The new and improved process for the separation of cerium from the other rare earths is in its mechanism extremely clear and simple. However, the efficiency of this process as a practical and economical means of separating cerium and the other rare earths depends on the observation of certain operational conditions.

I found, and it is an object of this invention, that the oxidation of cerium is performed preferentially at a temperature around of about 45°, using an excess of between 10 and 30% over the quantity necessary for the oxidation of the cerium contained in the mixture. This excess is necessary because a small part of the chlorine introduced into the suspension of the hydroxides forms hypochlorides of the rare earths, which in turn are decomposed into chlorides and oxygen. This fraction of the chlorine is lost as oxidant.

The separation of the trivalent rare earths from the oxidised cerium is performed according to this invention by adding hydrochloric acid to the oxidized suspension, and maintaining a temperature between 50° and 70° until the pH reaches a value between 2 and 3. The lower the final pH the smaller the contamination of the cerium oxide finally obtained with other rare earths. However, a too low final pH will result in a partial dissolution of the cerium.

It was found, and it is an object of this invention, that the solubilization of quadrivalent cerium may be largely prevented by passing, during the addition of the hydrochloric acid, a small amount of chlorine through the solution.

I found furthermore that the separation of cerium and the other rare earths as well as the filterability of the cerium precipitate are considerably improved by adding together with the hydrochloric acid, sulfuric acid in an amount between 5% and 20% of the weight of the cerium oxide present in the mixture.

The new and improved process, is equally efficient if the mixture of the hydroxides, carbonates or basic salts also contains thorium oxide. In this case the oxidation of the cerium as well as the dissolution of the trivalent rare earths are performed in the same way as in the absence of thorium, the bulk of the thorium remaining insoluble. The small fraction of thorium solubilized with the trivalent rare earths can be easily and quantitatively precipitated by increasing the pH of the mixture to 3.5 to 4. The mixture of the oxides or basic salts of quadrivalent cerium and thorium thus obtained can be separated using, for instance, the process described in U.S. Patent application Serial No. 755,895, filed August 19, 1958, and entitled "A Process for the Separation of Thorium, Cerium and Rare Earths from their Oxides or Hydroxides."

*Examples*

(1) A mixture of rare earth hydroxides of a composition as occurring in monazite and containing about 47% of cerium oxide of total rare earths oxides, obtained by a treatment of rare earths and sodium double sulfates with caustic soda and totaling 500 kg. of oxides is mixed with 1000 l. of water or of wash water from a previous operation. The mixture is heated to 45° and 70 kg. of gaseous chlorine are introduced while maintaining the mixture well agitated. Thereafter the mixture is heated to 60° and hydrochloric acid of 23° Bé. is added until the pH reaches and maintains a value of 2.5. The temperature is maintained below 75° and during the entire operation a slow current of chlorine is passed through the mixture. The reaction mixture is filtered through a wooden filter press and washed with 1000 l. water, which in turn are used for the preparation of a new charge. Washing is continued until the wash water is free of rare earths, the latter being recovered by precipitating with sodium carbonate. The principal solution contains between 130 and 140 g. of rare earths oxides per liter of which about 1% is represented by cerium. The filter cake contains about 99% of the cerium present in the original mixture and between 6% and 8% of other rare earths, based on its cerium oxide content.

(2) A mixture of hydroxides of rare earths and of thorium resulting from an alkaline attack of monazite totaling 500 kg. of rare earths oxides and 45 kg. of thorium oxide is mixed with 1200 l. of water and thereafter the cerium oxidised as described in the first example with 70 kg. of chlorine at a temperature of 50°. The mixture is heated to 60° and there is simultaneously added thereto 320 kg. of hydrochloric acid of 22° Bé. and 25 kg. of sulfuric acid used as a 25% solution. The time of addition is about 4 hours, the temperature being maintained below 70° and a slow current of chlorine is passed through the mixture. Addition of the acid is stopped if the final pH reaches a value of 2.6. to 2.8. Thereafter 1% ammonia is added until a pH of 3.6 is reached and the mixture filtered in a wooden filter press. The cake is washed with 1200 l. of water using the wash water for the preparation of a next charge. Washing is continued until the wash water is free of rare earths. The principal solution contains about 120 g. of rare earths oxides per liter of which about 2% are represented by cerium and is practically free of thorium. The filter cake contains the total of the thorium originally present, about 98% of the cerium and about 10% of other rare earths based on its cerium oxide content.

What is claimed is:
A method of separating cerium from other rare earths, comprising the steps of passing a halogen selected from the group consisting of chlorine and bromine through an aqueous suspension of hydroxides of a plurality of rare earths including cerium and also including thorium at a temperature of about 40–50° C. so as to oxidize said cerium, utilizing an amount of said halogen in excess by about 10–30% of the amount theoretically necessary for complete oxidization of the total amount of cerium contained in said suspension, thereby forming a suspension containing compounds of said cerium being substantially only in tetravalent state and also containing suspended thorium in tetravalent state while the other rare earths remain substantially only in trivalent state; adding hydrochloric acid to the thus formed suspension at a temperature of about 50–70° C. in an amount sufficient to lower the pH of the aqueous medium to between about 2 and 3 so as to dissolve said other rare earths and also adding said halogen in a small amount sufficient to prevent solubilization of said tetravalent cerium compounds, thereby forming a suspension of substantially only tetravalent cerium and thorium compounds; and increasing the pH of said aqueous liquid to between about 3.5 and 4 so as to precipitate therefrom any dissolved thorium; and separating said suspended tetravalent cerium and thorium from the aqueous liquid.

References Cited in the file of this patent

UNITED STATES PATENTS 2,327,992   Blumenfeld _____ Aug. 31, 1943

FOREIGN PATENTS 488,008   Great Britain _____ June 29, 1938

OTHER REFERENCES

Mellor: Comprehensive Treatise on Inorganic and Theoretical Chemistry, vol. 5, pages 572–73 (1924), Longmans Green & Co., New York.

Bearse et al.: "Chemical Engineering Progress," vol. 50, May 1954, pp. 235–239.